(12) United States Patent
Mizuno et al.

(10) Patent No.: US 7,018,698 B2
(45) Date of Patent: Mar. 28, 2006

(54) OPTICAL INFORMATION RECORDING MEDIUM

(75) Inventors: Masaaki Mizuno, Tokyo (JP);
Hiroyuki Hoshino, Tokyo (JP);
Michikazu Horie, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 22 days.

(21) Appl. No.: 10/900,108

(22) Filed: Jul. 28, 2004

(65) Prior Publication Data

US 2005/0002322 A1   Jan. 6, 2005

Related U.S. Application Data

(63) Continuation of application No. PCT/JP03/11369, filed on Sep. 5, 2003.

(30) Foreign Application Priority Data

Sep. 6, 2002 (JP) ............................ 2002-260730

(51) Int. Cl.
*B32B 3/02* (2006.01)
(52) U.S. Cl. .................. 428/64.1; 428/64.5; 428/64.6; 430/270.13
(58) Field of Classification Search ............... 428/64.5; 430/270.13
See application file for complete search history.

(56) References Cited

U.S. PATENT DOCUMENTS

| | | | |
|---|---|---|---|
| 6,004,646 A | 12/1999 | Ohno et al. | |
| 6,115,352 A | 9/2000 | Ohno et al. | |
| 6,143,468 A | 11/2000 | Ohno et al. | |
| 6,177,166 B1 * | 1/2001 | Ohno et al. ................ 428/64.1 |
| 6,231,945 B1 * | 5/2001 | Miyamoto et al. ......... 428/64.1 |
| 6,312,780 B1 * | 11/2001 | Kasami et al. ............ 428/64.1 |
| 6,567,367 B1 | 5/2003 | Ohno et al. | |
| 6,707,783 B1 | 3/2004 | Ohno | |
| 6,716,507 B1 * | 4/2004 | Tabata ...................... 428/64.1 |
| 6,723,410 B1 | 4/2004 | Ohno et al. | |
| 2002/0168587 A1 * | 11/2002 | Sakaue et al. .......... 430/270.13 |

FOREIGN PATENT DOCUMENTS

| | | |
|---|---|---|
| JP | 5-325261 | 12/1993 |
| JP | 8-115536 | 5/1996 |
| JP | 11-238253 | 8/1999 |
| JP | 2002-74741 | 3/2002 |
| JP | 2002-74746 | 3/2002 |

OTHER PUBLICATIONS

U.S. Appl. No. 09/919,846, filed Aug. 2, 2001, Ohno et al.
U.S. Appl. No. 09/530,599, filed May 9, 2000, Mizuno et al.
U.S. Appl. No. 10/059,193, filed Jan. 31, 2002, Horie et al.
U.S. Appl. No. 10/378,990, filed Mar. 5, 2003, Horie et al.
U.S. Appl. No. 09/573,319, filed May 18, 2000, Unknown.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

To obtain an optical information recording medium which is highly sensitive and excellent in durability against repeated recording and which is excellent in storage stability. An optical information recording medium is employed which comprises a substrate, a recording layer, a sulfur-containing protective layer, an interface layer in contact with the protective layer and a reflective layer in contact with the interface layer and containing Ag as the main component, wherein the interface layer contains Nb and/or Mo as the main component. By providing such an interface layer, the reaction between the reflective layer and the protective layer is effectively suppressed.

9 Claims, 1 Drawing Sheet

OPTICAL INFORMATION RECORDING MEDIUM

TECHNICAL FIELD

The present invention relates to an optical information recording medium. Particularly, it relates to an optical information recording medium excellent in the recording characteristics and storage stability, wherein the reaction between the protective layer and the reflective layer is effectively suppressed.

BACKGROUND ART

An optical information recording medium having a recording layer is practically used as a rewritable optical disk such as CD-RW or DVD-RW. Such an optical information recording medium usually takes a four layer structure comprising a protective layer, a recording layer, a protective layer and a reflective layer on a substrate. Here, it is common to employ an Al alloy for the reflective layer.

With those presently practically used as rewritable optical information recording media, a crystallized state corresponds to a non-recorded or erased state, and an amorphous non-crystallized mark corresponds to a recorded state. The recorded i.e. amorphous marks can be formed by heating the recording layer to a temperature higher than the melting point, followed by quenching. On the other hand, the erased i.e. crystallized state can be formed by heating the recording layer to a temperature which is higher than the crystallization temperature of the recording layer and lower than the melting point.

As mentioned above, the recording layer is heated and cooled at the time of recording and erasing, and due to such thermal history, the recording layer is likely to undergo evaporation or deformation. Accordingly, in order to prevent evaporation or deformation of the recording layer, it is common to sandwich the recording layer between highly heat resistant and chemically stable protective layers. Further, such protective layers promote thermal diffusion from the recording layer during the recording and bring the recording layer to a super cooled state, and thus it contributes to formation of an amorphous mark.

Further, a metal reflective layer is formed on the structure having the recording layer sandwiched between the protective layers, whereby due to an optical interference effect, the signal modulation degree at the time of playback will be increased, the thermal diffusion will be further promoted to further stabilize formation of amorphous marks, and further, the erasing characteristics or repeated recording characteristics will be improved.

Here, if a so-called rapid-cooling structure is taken, for example, by reducing the thickness of the protective layer between the recording layer and the reflective layer, heat dissipation of the recording layer will be further promoted, whereby formation of amorphous marks will be further facilitated, and the high speed recording, the recording sensitivity and the durability against repeated recording can be improved. Further, in order to realize the high speed recording, it is studied to change the material for the reflective layer from a conventional Al alloy to a material containing Ag as the main component which has a higher heat dissipation effect. By using Ag, heat dissipation of the recording layer will be further promoted, and it becomes possible to form amorphous marks at a high speed.

DISCLOSURE OF THE INVENTION

However, if a reflective layer containing Ag as the main component is formed directly on a protective layer, Ag in the reflective layer is likely to be corroded depending upon the material of the protective layer, whereby there will be a problem that the storage stability of an optical information recording medium deteriorates. Especially when a reflective layer containing Ag as the main component is employed in contact with a protective layer containing sulfur like ZnS-$SiO_2$, such corrosion of Ag tends to be distinct. It is considered that such corrosion is caused by a reaction of sulfur in ZnS with Ag. By a study by the present inventors, it has been found that as compared with Al or Au, Ag is more susceptible to corrosion by a reaction with sulfur. Accordingly, in a case where a material containing Ag as the main component is used for a reflective layer, it becomes important to suppress such corrosion of Ag.

The present invention has been made to solve such a problem, and it is an object of the present invention to provide an optical information recording medium having good recording characteristics and being excellent in storage stability.

Under these circumstances, the present inventors have conducted an extensive study with an aim to suppress corrosion of Ag due to the reaction of the reflective layer containing Ag as the main component with the material of the protective layer containing sulfur. As a result, they have found it possible to suppress deterioration of the recording characteristics and storage stability of an optical information recording medium due to such corrosion of Ag, if a layer containing a prescribed material such as Nb as the main material, is provided between the reflective layer and the protective layer, and thus have accomplished the present invention.

The gist of the present invention resides in an optical information recording medium comprising a substrate, a recording layer, a sulfur-containing protective layer, an interface layer in contact with the protective layer and a reflective layer in contact with the interface layer and containing Ag as the main component, wherein the interface layer contains Nb and/or Mo as the main component.

According to the present invention, it is possible to obtain an optical information recording medium which has a high sensitivity and is excellent in durability against repeated recording and which is excellent also in storage stability.

Particularly, it is possible to effectively suppress corrosion of Ag due to the reaction of the reflective layer and the protective layer, which is problematic in a case where a reflective layer containing Ag as the main component and a protective layer containing sulfur, are used, by providing a layer containing a prescribed element such as Nb as the main component, between the reflective layer and the protective layer.

BEST MODE FOR CARRYING OUT THE INVENTION

Figure 1:
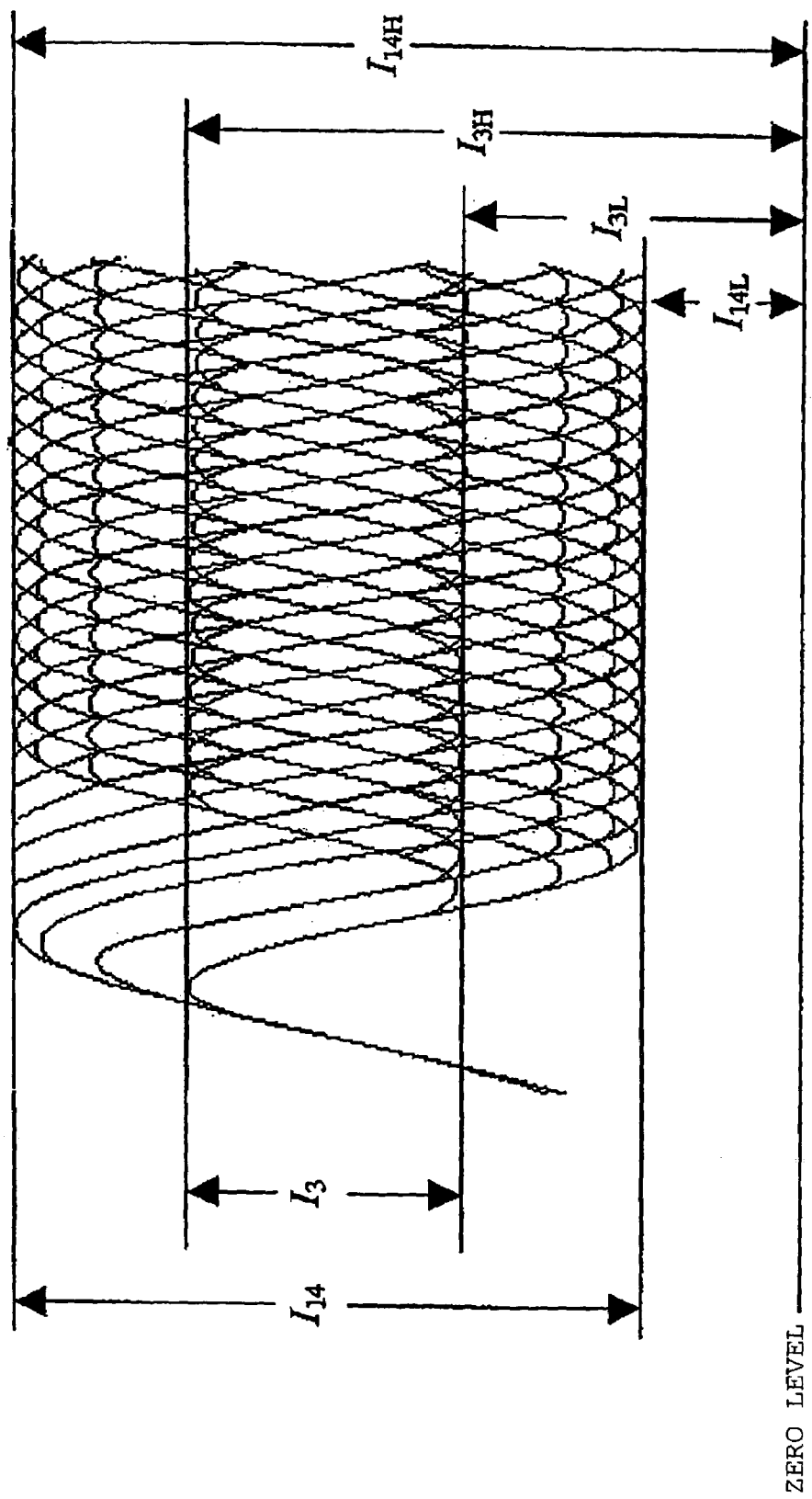
FIG. 1 is a schematic view illustrating playback waveform (eye pattern) of 8–16 modulation signals.

The interface layer, the reflective layer, the protective layer and the recording layer of an optical information recording medium to be used in the present invention, will be described. Thereafter, specific embodiments of the optical information recording medium of the present invention will be described.

(1) Interface Layer

In the optical information recording medium of the present invention, the interface layer containing Nb and/or Mo as the main component, is provided between the protective layer containing sulfur and the reflective layer containing Ag as the main component.

In the present invention, "containing a prescribed element as the main component" means that the content of the prescribed element is at least 50 atomic % in the entire layer in which the prescribed element is contained.

In the reflective layer containing Ag as the main component, it may happen that Ag will react with the material of the protective layer containing sulfur, which is in contact therewith, whereby Ag will be corroded. Such a tendency becomes distinct when a material containing a sulfide (such as $ZnS$-$SiO_2$) is used for the protective layer. It is considered that Ag is corroded by the sulfur component contained in the protective layer. Accordingly, in the present invention, corrosion of the Ag reflective layer is certainly suppressed by forming an interface layer containing a prescribed element such as Nb as the main component, between the reflective layer and the protective layer.

In the present invention, Nb and/or Mo is used as the material for the interface layer. Here, Nb and Mo may, of course, be used in combination as the material for the interface layer. However, from the viewpoint of the production efficiency and costs, it is preferred to use Nb or Mo alone. The reason for employing a layer containing at least one of Nb and Mo as the main component, is that such an element is a stable metal excellent in corrosion resistance and heat resistance and therefore will not react with the protective layer material or the reflective layer material, whereby the reaction of the above protective layer with the reflective layer can effectively be suppressed. Further, such elements also have a merit that they are industrially very inexpensive. Further, Nb has malleability and thus has a further merit that when formed into a thin film it will be free from a problem such as a peeling of the film due to an internal stress. Furthermore, Nb and Mo have a relatively high thermal conductivity as compared with other materials such as Ta, and thus have a merit that they do not hinder heat dissipation to the reflective layer containing Ag as the main component.

The content of Nb and/or Mo in the interface layer is preferably at least 80 atomic %, more preferably at least 90 atomic %, particularly preferably at least 95 atomic %, most preferably 100 atomic % (in a case where Nb is used for the interface layer, the interface layer is made of pure Nb). The larger the content of Nb and/or Mo, the better the suppression of the reaction of the protective layer with the reflective layer. In a case where Nb and Mo are used in combination, the respective contents of Nb and Mo may suitably be adjusted depending upon the characteristics desired for the interface layer.

The interface layer may contain other elements to such an extent not to impair the characteristics of the layer, as the case requires. When other elements are contained, the content of such elements is preferably not more than 20 atomic %, more preferably not more than 10 atomic %, particularly preferably not more than 5 atomic %, most preferably not more than 2 atomic %. Such elements may, for example, be Ni, Pd, Pt, Si, O, Se, V, Ti and Ta. The light transmittance of the interface layer is preferably at least 50%, more preferably at least 60%, further preferably at least 70%, particularly preferably at least 80%, most preferably at least 85%, at the center wavelength of light to be used for recording on the optical information recording medium.

If the light transmittance of the interface layer is too small, in other words, if the light absorption of the interface layer is too large, deterioration of the recording sensitivity of the optical information recording medium will be brought about. As a reason for deterioration of the recording sensitivity, it may be mentioned that if the interface layer has an excessively large light absorption for light with a wavelength to be used for recording, 1) the incident laser beam will be absorbed, and the absorbed laser beam can not be utilized for recording (consequently, the reflectance at the reflective layer will be low), and 2) due to absorption of the laser beam at the interface layer and the subsequent heat generation, the high heat dissipation property as one of merits of the reflective layer containing Ag as the main component, can not be utilized, and the cooling rate of the recording layer tends to be slow, whereby during formation of an amorphous mark, a recrystallized portion tends to be large and the amorphous mark tends to be small.

Further, light to be used for recording, is usually a laser beam. A laser beam is a coherent light, and although it can be made to be a monochromatic light having an extremely narrow spectrum width, it still has a certain wavelength distribution from the center wavelength. Accordingly, in a case where the light transmittance of the interface layer is measured in the present invention, the value of the light transmittance at the center wavelength of the above-mentioned laser beam having a certain wavelength distribution, will be used.

The light transmittance of the interface layer may be measured by a usual method. It is necessary to measure the light transmittance in the same state as the state where the interface layer is used in an optical information recording medium. Accordingly, for example, an interface layer may be formed on a slide glass substrate under the same conditions as for the production of an optical information recording medium, and the light transmittance of this interface layer may be measured by means of a known spectral photometer (e.g. model name UV-3100S, manufactured by Shimadzu Corporation).

The thickness of the interface layer is preferably at least 1 nm, more preferably at least 2 nm. If the thickness of the interface layer is too thin, there may be a case where it can not effectively suppress the reaction of the protective layer with the reflective layer. If the thickness is within the above range, the reliability of the optical information recording medium can be made to be well secured even in a reliability test under a severe environment of high temperature and high humidity (such as 80° C./85% RH).

On the other hand, the thickness of the interface layer is preferably at most 10 nm, more preferably at most 9 nm, further preferably at most 8 nm, particularly preferably at most 6 nm. In such a range, it becomes possible to suppress the reaction of Ag in the reflective layer with S in the protective layer while securing a good transmittance of the interface layer.

The thermal conductivity of Nb or Mo as the material to be used for the interface layer of the present invention, is lower than Ag to be used for the reflective layer. Accordingly, even if it is assumed that the light absorption of the interface layer is extremely small, if the thickness of the interface layer becomes too thick, the heat dissipation effect of the reflective layer containing Ag as the main component is likely to be impaired. Namely, if the interface layer is thick, it will be required to irradiate a higher recording power to form a wider molten region to supplement a decrease in the size of an amorphous mark due to recrystallization, to set off the deterioration of the heat dissipation effect. This means that the recording sensitivity of the optical information recording medium will deteriorate. Further, if the thickness becomes too thick, the light transmittance of a single layer of the above interface layer, will be low at the center wavelength of light to be used for the recording. Thus, if the interface layer is made to have the thickness within the above range, it will be possible to secure good heat dissipation effect and light transmittance of the interface layer.

The interface layer is usually formed by a sputtering method, and it is advisable to suppress the amount of impurities in the target itself or the moisture or the amount of oxygen to be included during film forming. For this purpose, when an interface layer is formed by sputtering, the ultimate vacuum in the process chamber is preferably adjusted to be less than $1 \times 10^{-3}$ Pa. Further, in order to increase the film density of the interface layer, it is advisable to carry out sputtering under a low pressure, and the film forming pressure is preferably at most 1 Pa, more preferably at most 0.5 Pa.

The atomic weight of Nb or Mo is relatively close to Ag contained in the reflective layer, and the ejection angle of each element from the target at the time of film forming by a sputtering method, will be substantially the same as Ag, whereby a film thickness distribution on the substrate facing the target, will be secured, and there is a merit that the uniformity can easily be secured.

Further, Nb and Mo have a merit that the price per kg of the raw material is very low at a level of from 1/10 to 1/100 of other material such as Ta, and there will be a merit that the target can be produced at a low cost.

(2) Reflective Layer

For a reflective layer, it has been common to employ an alloy containing Al as the main component and containing an element such as Ta, Ti, Co or Cr. However, in the present invention, Ag having a thermal conductivity further higher than Al, is used, whereby the heat dissipation effect will be increased. Accordingly, it is possible to improve the recording sensitivity and the durability against repeated recording.

The content of Ag in the reflective layer containing Ag as the main component, is preferably at least 80 atomic %, more preferably at least 90 atomic %, particularly preferably at least 95 atomic %. The larger the content of Ag, the higher the thermal conductivity of the reflective layer. Accordingly, the reflective layer may be made solely of Ag (pure silver) in order to increase the thermal conductivity.

As a component other than Ag contained in the reflective layer, at least one element selected from the group consisting of Ti, V, Ta, Co, Cr, Si, Ge, Sn, Sc, Hf, Pd, Rh, Au, Pt, Mg, Zr, Cu, Mo and Mn may be mentioned. The content of such an element is usually at least 0.2 atomic % and at most 5 atomic %. Within such range, it is possible to suppress deterioration of the thermal conductivity while improving the corrosion resistance of the reflective layer containing Ag as the main component.

The thickness of the reflective layer is usually at least 50 nm, preferably at least 100 nm. Within this range, it is possible to effectively suppress deterioration of the recording sensitivity. On the other hand, the thickness of the reflective layer is usually at most 300 nm, preferably at most 250 nm. Within this range, a sufficient heat dissipation effect can be obtained.

The reflective layer is formed usually by a sputtering method or a vacuum vapor evaporation method. In a case where a sputtering method is employed, the total amount of impurities including the amount of impurities contained in the target or the material for vapor evaporation and the amount of moisture or oxygen included during the film formation, is preferably controlled to be less than 2 atomic %. For this purpose, in a case where the reflective layer is formed by sputtering, the ultimate vacuum of the process chamber is preferably adjusted to be less than $1 \times 10^{-3}$ Pa. Further, in a case where film formation is carried out at an ultimate vacuum lower than $1 \times 10^{-4}$ Pa, it is advisable to prevent inclusion of impurities by controlling the film forming rate to be at least 1 nm/sec., preferably at least 10 nm/sec. Otherwise, in a case where an additional element is intentionally incorporated in an amount of more than 1 atomic %, it is advisable to prevent inclusion of accompanying impurities as far as possible by adjusting the film forming rate to be at least 10 nm/sec.

(3) Protective Layer

The material to be used for the protective layer is determined taking into consideration the refractive index, the thermal conductivity, the chemical stability, the mechanical strength, the adhesion, etc. Usually, it is possible to employ an oxide, a sulfide, a nitride, a carbide of a metal or semiconductor having high transparency and high melting point, or a fluoride of Ca, Mg, Li or the like. Such an oxide, a sulfide, a nitride, a carbide or a fluoride may not necessarily take a stoichiometrical composition, and it is also effective to control the composition in order to control e.g. the refractive index or to use such materials in combination as a mixture.

In the present invention, sulfur is incorporated in the protective layer to be provided in contact with the interface layer. When the protective layer contains sulfur, sulfur will react with Ag to deteriorate the recording characteristics of the optical information recording medium. Accordingly, the effect of using the interface layer will be distinct.

With respect to the form of sulfur contained in the protective layer, a form of a sulfide or oxysulfide of any element selected from a rare earth element, Zn and Ta, may be mentioned. Here, the rare earth element means the Group 3B element in the Periodic Table. Specifically, Sc, Y, a lanthanoid element and an actinoid element may be mentioned. However, preferred is one selected from the group consisting of La, Ce, Nd and Y.

The above sulfide or oxysulfide may specifically be in the form of a sulfide or oxysulfide of a rare earth such as La, Ce, Nd or Y or in the form of a sulfide of Zn or Ta. As such a sulfide or oxysulfide, ZnS, $TaS_2$ or $Y_2O_2S$ may more specifically be mentioned.

In a case where a sulfide or oxysulfide of a rare earth element such as La, Ce, Nd or Y is employed, such a sulfide is preferably contained in an amount of from 50 mol % to 90 mol % in the protective layer. Further, in a case where ZnS or $TaS_2$ is employed, such a sulfide is preferably contained in an amount of from 70 mol % to 90 mol % in the protective layer.

When the above sulfide or oxysulfide is used, another compound may be used in combination of such a sulfide or oxysulfide. As such a compound, a dielectric material may usually be mentioned. The dielectric material may, for example, be an oxide of e.g. Sc, Y, Ce, La, Ti, Zr, Hf, V, Nb, Ta, Zn, Al, Cr, In, Si, Ge, Sn, Sb or Te, a nitride of Ti, Zr, Hf, V, Nb, Ta, Cr, Mo, W, Zn, B, Al, Ga, In, Si, Ge, Sn, Sb or Pb, a carbide of e.g. Ti, Zr, Hf, V, Nb, Ta, Cr, Mo, W, Zn, B, Al, Ga, In or Si, or a mixture thereof. Further, the dielectric material may, for example, be a selenide or a telluride of Zn, Y, Cd, Ga, In, Si, Ge, Sn, Pb, Sb or Bi, a fluoride of e.g. Mg or Ca, or a mixture thereof.

In a case where ZnS is used as the sulfide, the material to be mixed in the protective layer is preferably $SiO_2$. With $ZnS$-$SiO_2$, the film forming rate is high, the film stress is small, the volume change due to a temperature change is small, and it has excellent weather resistance. Accordingly, in many cases, it is used for a protective layer of an optical information recording medium having a phase-change type recording layer.

In a case where $TaS_2$ is used as the sulfide, the material to be mixed in the protective layer is preferably $Ta_2O_5$. By using a sulfide and an oxide of the same metal Ta in combination, it is possible to obtain a protective layer having a high hardness and being excellent in the adhesion.

The film density of such a protective layer is preferably adjusted to be at least 80% of the bulk state in view of the mechanical strength and repeated recording characteristics. In a case where a mixture of dielectrics is employed, a theoretical density of the formula (1) given hereinafter, is employed as the bulk density.

The thickness of the protective layer varies depending upon the position where the protective layer is employed. The thickness of the protective layer is will be described in detail when the layer structure of a specific optical information recording medium will be described, but it is generally as follows. Namely, the thickness of the protective layer is preferably at least 5 nm so that the effect for preventing deformation of the recording layer is made sufficient, and it will function as a protective layer. On the other hand, in order to reduce the internal stress of the dielectric itself constituting the protective layer or to minimize the difference in the elastic characteristics from the film in contact thereby to prevent cracking, the film thickness is preferably adjusted to be at most 500 nm. Usually, the material constituting the protective layer has a low deposition rate and requires a long deposition time. In order to shorten the deposition time thereby to shorten the production time and reduce the production cost, the thickness of the protective layer is preferably adjusted to be at most 200 nm, more preferably at most 150 nm.

The protective film is formed usually by a sputtering method. In a case where a sputtering method is employed, the total amount of impurities including the amount of impurities of the target itself and the amount of moisture or oxygen included during the film formation, is preferably adjusted to be less than 2 atomic %. For this purpose, at the time of forming the protective layer by sputtering, the ultimate vacuum of the process chamber is preferably made to be less than $1 \times 10^{-3}$ Pa.

(4) Recording Layer

For a recoding layer, as repeatedly recordable materials, compounds of a type such as GeSbTe, InSbTe, AgSbTe and AgInSbTe are selected. Among these, a composition containing a pseudo binary alloy of $Sb_2Te_3$ and GeTe as the main component, more specifically a $\{(Sb_2Te_3)_{1-\alpha}(GeTe)_\alpha\}_{1-\beta}Sb_\beta$ composition (wherein $0.2 \leq \alpha \leq 0.9$, $0 \leq \beta \leq 0.1$), or a composition containing Sb as the main component i.e. containing at least 50 atomic % of Sb, is used in many cases.

In the present invention, in order to increase the crystallization rate, it is particularly preferred to employ a composition containing Sb as the main component, for the recording layer. In the present invention, "containing Sb as the main component" means that the Sb content is at least 50 atomic % of the entire recording layer. The reason for making Sb as the main component is that amorphous Sb can be crystallized at a very high rate, whereby an amorphous mark can be crystallized in a short time. Accordingly, erasing of a record mark in an amorphous state will be facilitated. From this viewpoint, the Sb content is preferably at least 60 atomic %, more preferably at least 70 atomic %. However, on the other hand, rather than employing Sb alone, it is preferred to use, in combination with Sb, an additional element in order accelerate formation of an amorphous phase and to increase the stability with time in an amorphous state. In order to accelerate the formation of amorphous phase of the recording layer and to increase the stability with time of the amorphous state, the content of such an additional element is usually at least 1 atomic %, preferably at least 5 atomic %, more preferably at least 10 atomic %, while it is usually at most 30 atomic %.

The additional element which accelerates formation of an amorphous phase and which increases the stability with time of the amorphous state, also has an effect of increasing the crystallization temperature. As such an additional element, Ge, Te, In, Ga, Sn, Pb, Si, Ag, Cu, Au, a rare earth element, Ta, Nb, V, Hf, Zr, W, Mo, Cu, Cr, Co, nitrogen, oxygen or Se may, for example, be employed. Among such additional elements, preferred with a view to accelerating formation of an amorphous phase, improving the stability with time of the amorphous state and increasing the crystallization temperature, is at least one selected from the group consisting of Ge, Te, In, Ga and Sn, and particularly preferred is to employ Ge and/or Te, or at least one of In, Ga and Sn.

As mentioned above, in the present invention, for the material of the recording layer, it is particularly preferred to use Sb, and Ge and/or Te, in combination. At the time of adding Ge and/or Te to Sb, it is preferred to adjust the content of Ge or Te in the recording layer to be from 1 atomic % to 30 atomic %. Namely, it is preferred that Ge and Te are contained, each independently, in an amount of from 1 atomic % to 30 atomic %. However, when the main component of the recording layer is Sb, the content of Sb is at least 50 atomic %. Accordingly, when Ge and Te are incorporated in the recording layer together with Sb, the total amount of Ge and Te will be less than 50 atomic %.

Each content of Ge or Te in the recording layer is preferably at least 3 atomic %, more preferably at least 5 atomic %. In this range, the effect for stabilizing an amorphous mark will be sufficiently obtained. On the other hand, each content of Ge or Te in the recording layer is more preferably at most 20 atomic %, further preferably at 15 atomic %. In this range, it will be possible to effectively suppress the tendency that the amorphous phase tends to be too stable and crystallization adversely tends to be slow, whereby it will be possible to suppress noises due to light scattering at crystal grain boundaries.

The composition containing Sb as the main component can be classified into two types depending upon the amount of Te contained in the recording layer. One is a composition containing at least 10 atomic % of Te and the other is a composition containing less than 10 atomic % of Te (inclusive of a case where no Te is contained).

One of them is that the material for the recording layer is made to have a composition containing as the main component an alloy containing Sb in excess of a $Sb_{70}Te_{30}$ eutectic composition while containing at least 10 atomic % of Te. This material for the recording layer will hereinafter be referred to as a SbTe eutectic. Here, Sb/Te is preferably at least 3, more preferably at least 4.

The following one may be mentioned as another composition containing Sb as the main component, which can be classified depending upon the amount of Te contained in the recording layer. Namely, the composition of the recording layer is adjusted so that while maintaining Sb as the main component, Te is made to be less than 10 atomic %, and Ge is incorporated as an essential component. As a specific example of such a composition of the recording layer, an alloy containing, as the main component, a eutectic alloy having a composition close to $Sb_{90}Ge_{10}$ and containing less than 10 atomic % of Te (in this specification, this alloy will be referred to as a SbGe eutectic) may preferably be mentioned.

The composition containing less than 10 atomic % of Te is not a SbTe eutectic and tends to have a nature as a SbGe eutectic. Such a SbGe eutectic alloy has a low noise, since even if the Ge content is high at a level of about 10 atomic %, the crystal particle size in a polycrystalline state after the initial crystallization is relatively fine, and the crystalline state tends to form a single phase. In the SbGe eutectic alloy, Te is added merely additionally and will not be an essential element.

With the SbGe eutectic alloy, the crystallization rate can be increased by relatively increasing the Sb/Ge ratio, and recrystallization of an amorphous mark by recrystallization will be possible.

In a case where a composition containing Sb is used for the recording layer so that the crystalline state is an unrecorded or erased state, and recording is carried out by forming an amorphous mark, it will be very important to improve the cooling efficiency, for the following reason.

Namely, for a recording layer containing Sb as the main component, such as the above-mentioned SbTe eutectic or SbGe eutectic, in order to meet with high speed recording, Sb is added excessively beyond the vicinity of the $Sb_{70}Te_{30}$ eutectic point or the $Sb_{90}Ge_{10}$ eutectic point to increase the crystal growth rate rather than the crystal nuclear forming rate, thereby to increase the crystallization rate. Therefore, for such a recording layer, it is preferred to control a change of an amorphous mark due to recrystallization (reduction of an amorphous mark than the desired size) by increasing the cooling rate of the recording layer. Accordingly, in order to certainly form an amorphous mark after melting the recording layer, it becomes important to quench the recording layer, and it becomes very important to increase the cooling efficiency of the recording layer. Therefore, in the above composition for the recording layer, it is particularly preferred to employ Ag or a Ag alloy having a high heat dissipation to the reflective layer.

In the present invention, in a recording layer employing the above composition containing Sb as the main component such as the SbTe eutectic or the SbGe eutectic, it is particularly preferred to further incorporate at least one of In, Ga and Sn, so that the content of each of In, Ga and Sn in the recording layer will be from 1 atomic % to 30 atomic %.

Now, a specific example of the composition containing Sb as the main component will be further described.

Firstly, the composition containing Sb as the main component may preferably be a SbTe eutectic composition containing, as the main component, an alloy of $(Sb_xTe_{1-x})_{1-y}M_y$ (wherein $0.6 \leq x \leq 0.9$, $0 \leq y \leq 0.3$, and M is at least one member selected from Ge, Ag, In, Ga, Zn, Sn, Si, Cu, Au, Pd, Pt, Pb, Cr, Co, O, S, Se, V, Nb and Ta). In the above compositional formula, the composition is represented by an atomicity ratio. Thus, for example, x=0.6 means 60 atomic %.

It is particularly preferred to use one or more of the above $(Sb_xTe_{1-x})_{1-y}M_y$ (in the composition, M is Ge, Ga, Ag or In), from the viewpoint of the recording characteristics such as overwriting characteristics.

In the above $(Sb_xTe_{1-x})_{1-y}M_y$ composition, x is usually at least 0.6, preferably at least 0.7, more preferably at least 0.75, while it is usually at most 0.9. Further, y is usually at least 0, preferably at least 0.01, more preferably at least 0.03, while it is usually at most 0.3, preferably at most 0.2, more preferably at most 0.1. If x and y are within the above ranges, it is possible to obtain a recording layer which is capable of meeting with high speed recording.

The above $(Sb_xTe_{1-x})_{1-y}M_y$ composition wherein Ge is used as M, will be further described. As such a composition, it is preferred to employ a composition represented by $Ge_y(Sb_xTe_{1-x})_{1-y}$ (wherein $0.01 \leq y \leq 0.06$, $0.82 \leq x \leq 0.9$), which contains as a matrix a $Sb_{70}Te_{30}$ alloy based on a $Sb_{70}Te_{30}$ eutectic point composition, which contains Sb in a large excess and which further contains Ge. The amount of Ge is preferably at least 0.01, particularly preferably at least 0.02, as the value y in $Ge_y(Sb_xTe_{1-x})_{1-y}$. On the other hand, with such a SbTe eutectic composition having a large Sb content, if the amount of Ge is too much, an intermetallic compound of GeTe or GeSbTe type is likely to precipitate, and at the same time, a SbGe alloy may precipitate, whereby crystal grains having different optical constants will be coexistent in the recording layer. By the coexistence of such crystal grains, the noise of the recording layer may increase, and the jitter may increase. Further, even if Ge is added too much, the effect for the stability with time for an amorphous mark will be saturated. Accordingly, the amount of Ge is usually at most 0.06, preferably at most 0.05, more preferably at most 0.04, as the value of y in $Ge_y(Sb_xTe_{1-x})_{1-y}$.

In the above GeSbTe eutectic composition, it is particularly preferred to incorporate In, Ga or Sn. Namely, it is particularly preferred to employ a composition represented by $M1_zGe_y(Sb_xTe_{1-x})_{1-y-z}$ (wherein $0.01 \leq z \leq 0.4$, $0.01 \leq y \leq 0.06$, $0.82 \leq x \leq 0.9$, and M1 is at least one element selected from the group consisting of In, Ga and Sn). The characteristics will be further improved by adding at least one element selected from the group consisting of the above M1=In, Ga and Sn. The element such as In, Ga or Sn also has an effect to increase the optical contrast between the crystalline state and the amorphous state and to reduce the jitter.

Nitrogen, oxygen and sulfur may be mentioned as elements which may be incorporated in addition to In, Ga and Sn to the above GeSbTe eutectic composition. These elements are effective for fine adjustment for the optical characteristics or for prevention of segregation in repeated overwriting. The contents of nitrogen, oxygen and sulfur are more preferably at most 5 atomic % based on the total amount of Sb, Te and Ge.

Further, Sn, Cu, Zr, Hf, V, Nb, Ta, Cr or Co may be contained in the above GeSbTe eutectic position. These elements are effective to increase the crystallization temperature and to further improve the stability with time, without lowering the crystal growth rate, by an addition of a very small amount. However, if the amount of these elements is too much, segregation with time of a certain substance or segregation by repeated overwriting is likely to take place. Accordingly, the amount to be added is preferably at most 5 atomic %, particularly preferably at most 3 atomic %. If segregation takes place, the stability of amorphous phase which the recording layer initially has, or the recrystallization speed or the like may change, and the overwriting characteristics may deteriorate.

On the other hand, the SbGe eutectic composition as a composition containing Sb as the main component, may, for example, be a composition containing, as the main component, a TeGeSb type having Te added to the SbGe eutectic, or a composition containing, as the main component, a ternary alloy of InGeSb type, GaGeSb type or SnGeSb type, having In, Ga or Sn added to the SbGe eutectic. By adding Te, In, Ga or Sn to the SbGe eutectic alloy, it is possible to increase the effect for increasing the difference in the optical characteristics between the crystalline state and the amorphous state. It is particularly preferred to add Sn.

As a preferred composition of such a SbGe eutectic alloy, $Te_\gamma M2_\delta (Ge_\epsilon Sb_{1-\epsilon})_{1-\delta-\gamma}$ (wherein $0.01 \leq \epsilon \leq 0.3$, $0 \leq \delta \leq 0.3$, $0 \leq \gamma < 0.1$, $2 \leq \delta/\gamma$, $0 < \delta + \gamma \leq 0.4$, and M2 is one member selected from the group consisting of In, Ga and Sn) may be mentioned. By adding In, Ga or Sn to the SbGe eutectic alloy, it is possible to increase the effect for increasing the difference in the optical characteristics between the crystalline state and the amorphous state.

By using In or Ga as element M2, the jitter in the super high speed recording can be improved, and it becomes possible to increase also the optical contrast. For this purpose, $\delta$ representing the content of In and/or Ga is usually at least 0, preferably at least 0.01, more preferably at least 0.05. However, if In or Ga is excessive, separate from the crystal phase to be used as an erased state, another crystal phase of In—Sb type or Ga—Sb type having a very low reflectance may sometimes be formed. Thus, $\delta$ is usually at most 0.3, preferably at most 0.2. Further, when In and Ga are compared, In is preferred, since lower jitter can be realized, and the above M2 is preferably In.

On the other hand, by using Sn as element M2, the jitter at a super high speed recording can be improved, and it becomes possible to increase the optical contrast (the difference in reflectance between the crystalline state and the amorphous state). Thus, $\delta$ representing the content of Sn is usually at least 0, preferably at least 0.01, more preferably at least 0.05. However, if Sn is excessive, the amorphous phase immediately after the recording may sometimes change to another amorphous phase having a low reflectance. Especially when stored for a long time, this stabilized amorphous phase tends to precipitate, whereby the erasing performance tends to decrease. Thus, $\delta$ is usually at most 0.3, preferably at most 0.2.

As element M2, a plurality of elements among In, Ga and Sn may be employed. However, it is particularly preferred to incorporate In and Sn. When In and Sn are incorporated, the total content of these elements is usually at least 1 atomic %, preferably at least 5 atomic %, and usually at most 40 atomic %, preferably at most 30 atomic %, more preferably at most 25 atomic %.

With the above TeM2GeSb type composition, by the incorporation of Te, it becomes possible to improve the change with time of the erasing ratio in the super high speed recording. For this purpose, $\gamma$ representing the content of Te is usually at least 0, preferably at least 0.01, particularly preferably at least 0.05. However, if Te is excessive, the noise tends to be high. Therefore, $\gamma$ should usually be smaller than 0.1.

Further, in the above TeM2GeSb type composition, in a case where Te and element M2 are incorporated, it is effective to control the total content thereof. Accordingly, $\delta + \gamma$ representing the content of Te and element M2 is usually larger than 0, preferably at least 0.01, more preferably at least 0.05. If $\delta + \gamma$ is within this range, the effect of incorporating Te and element M2 simultaneously will be properly provided. On the other hand, in order to properly obtain the effect of employing the GeSb type eutectic alloy as the main component, $\delta + \gamma$ is usually at most 0.4, preferably at most 0.35, more preferably at most 0.3. On the other hand, $\delta/\gamma$ representing the atomicity ratio of element M2 to Te is preferably at least 2. By incorporation of Te, the optical contrast tends to decrease. Accordingly, when Te is incorporated, the content of element M2 is preferably made to be slightly large ($\delta$ is made slightly large).

Elements which may be added to the above TeM2GeSb type composition may, for example, be Au, Ag, Pd, Pt, Si, Pb, Bi, Ta, Nb, V, Mo, a rare earth element, N and O, and they are used for fine adjustment of the optical characteristics or the crystallization rate. However, their amount is at a level of 10 atomic % at the maximum.

In the foregoing, one of the most preferred compositions is a composition comprising as the main component an alloy system represented by $In_p Sn_q Te_r Ge_s Sb_t$ (wherein $0 \leq p \leq 0.3$, $0 \leq q \leq 0.3$, $0 < p+q \leq 0.3$, $0 \leq r < 0.1$, $0 < s \leq 0.2$, $0.5 \leq t \leq 0.9$, $p+q+r+s+t=1$). In a case where Te, and In and/or Sn, are used in combination, it is preferred that $(p+q)/r \geq 2$.

The thickness of the recording layer is preferably at least 5 nm in order to obtain a sufficient optical contrast or in order to increase the crystallization rate to accomplish erasing of a record in a short time. Further, in order to make the reflectance sufficiently high, the thickness is more preferably at least 10 nm.

On the other hand, in order to prevent cracking and to obtain a sufficient optical contrast, the thickness of the recording layer is preferably at most 100 nm, more preferably at most 50 nm. This is to reduce the thermal capacity thereby to increase the recording sensitivity. Further, in the above range, the volume change due to the phase change can be reduced, whereby the influence of the repeated volume change over the upper and lower protective layers due to repeated overwriting can be reduced. Further, accumulation of irreversible microscopic deformations can be suppressed, and the noise can be reduced, whereby the durability against repeated overwriting will be improved.

With a high density recording medium such as rewritable DVD, the demand against noise is severer and therefore, the thickness of the recording layer is more preferably at most 30 nm.

Such a recording layer can be formed usually by DC or RF sputtering of a prescribed alloy target in an inert gas, particularly in Ar gas.

Further, the density of the recording layer is usually at least 80%, preferably at least 90%, of the bulk density. Here, the bulk density $\rho$ is usually an approximate value by the following formula (1), but it may also be actually measured by preparing a bulk of an alloy composition constituting the recording layer.

$$P = \Sigma m_i \rho_i \qquad (1)$$

(wherein $m_i$ is the molar concentration of each element i, and $\rho_i$ is the atomic weight of element i.)

In a sputtering film-forming method, it is possible to increase the density of the recording layer by increasing the amount of high energy Ar to be irradiated to the recording layer by reducing the pressure of a sputtering gas (usually a rare gas such as Ar, the following description will be made with reference to a case of Ar) during film formation or by disposing the substrate to be close to the front surface of the target. The high energy Ar is usually either one where Ar ions irradiated to the target for sputtering will partly bounce back to reach the substrate, or one where Ar ions in a plasma will be accelerated by a sheath voltage of the entire surface of the substrate to reach the substrate.

Such an effect of irradiating a high energy rare gas is called an atomic peening effect. In sputtering in Ar gas which is commonly used, Ar will be included in the sputtered film by such an atomic peening effect. The atomic peening effect can be estimated by the Ar amount in the film. Namely, the Ar amount being small means that the effect of irradiating high energy Ar is little, whereby a film having a rough density is likely to be formed.

On the other hand, if the Ar amount is large, irradiation of high energy Ar will be strong, and the density of the film will be high, but Ar included in the film is likely to separate out as voids during repeated overwriting, whereby the durability against repeated overwriting tends to deteriorate. Accordingly, discharge is carried out under a proper pressure usually within a range of from $10^{-2}$ to $10^{-1}$ Pa.

(5) Specific Embodiments

Now, some specific embodiments of the optical information recording medium of the present invention will be described. However, it should be understood that the present invention is by no means restricted to the following specific embodiments.

A first specific embodiment of the optical information recording medium of the present invention may be an optical information recording medium which takes a layer structure wherein a first protective layer, a recording layer, a second protective layer containing sulfur, an interface layer and a reflective layer containing Ag as the main component are laminated in this order on a substrate and whereby signal recording or playback is carried out by irradiation of a laser beam through the substrate. This construction will be referred to as construction 1. In the present invention, the optical information recording medium is characterized in that it comprises a substrate, a recording layer, a protective layer containing sulfur, an interface in contact with the protective layer and a reflective layer in contact with the interface layer and containing Ag as the main component. In addition, in construction 1, usually, a first protective layer is inserted between the substrate and the recording layer.

Further, a second specific embodiment of the optical information recording medium of the present invention may be an optical information recording medium which takes a layer construction wherein a reflective layer containing Ag as the main component, an interface layer, a first protective layer containing sulfur, a recording layer and a second protective layer are laminated on a substrate in this order and whereby signal recording or playback is carried out by irradiating a laser beam through the second protective layer. This construction will be referred to as construction 2. In the present invention, the optical information recording medium is characterized in that it comprises a substrate, a recording layer, a protective layer containing sulfur, an interface layer in contact with the protective layer and a reflective layer in contact with the interface layer and containing Ag as the main component. In addition, in construction 2, usually, a second protective layer will be provided on the recording layer.

In construction 2, the recording medium may have a layer construction comprising a reflective layer containing Ag as the main component, an interface layer, a first protective layer containing sulfur, a recording layer and a second protective layer on each side of the substrate. In construction 2, signal recording or playback is carried out by irradiating a laser beam from the second protective layer side without passing it through the substrate, whereby the distance between the recording layer and the optical head can be reduced to a level of not more than a few hundreds µm, and by using an object lens having a numerical aperture of at least 0.7, it is possible to improve the recording density of the medium.

(5-1) Optical Information Recording Medium of Construction 1

The optical information recording medium of construction 1 will be described in detail.

For the substrate, a resin such as polycarbonate, acryl or polyolefin, or glass may, for example, be used. Among them, a polycarbonate resin is most widely used for e.g. CD-ROM and inexpensive, and thus, most preferred. The thickness of the substrate is usually at least 0.1 mm, preferably at least 0.3 mm, while it is usually at most 20 mm, preferably at most 15 mm. It is usually from about 0.6 mm to 1.2 mm. In construction 1, the substrate is required to let a laser beam pass therethrough and is required to be transparent to a laser beam.

The material for the first protective layer is determined taking into consideration the refractive index, the thermal conductivity, the chemical stability, the mechanical strength, the adhesion, etc. Usually, an oxide, sulfide, carbide or nitride of a semiconductor or a metal which is transparent and has high melting point, or a dielectric such as a fluoride of Ca, Mg, Li or the like, may be employed.

In this case, such an oxide, sulfide, carbide, nitride or fluoride may not necessarily have a stoichiometrical composition, and it is effective to control the composition to control e.g. the refractive index or to use them as mixed. In consideration of the repeated recording characteristics, a mixture of dielectrics is preferred. More specifically, a mixture of a chalcogenide compound such as ZnS or a rare earth sulfide and a heat resistant compound such as an oxide, nitride, carbide or fluoride, may be mentioned. For example, a mixture of heat resistant compounds containing ZnS as the main component, or a mixture of sulfides of rare earth elements, particularly heat-resistant compounds containing $Y_2O_2S$ as the main component, is an example of a preferred composition for the protective layer.

The material for forming the protective layer may, usually be a dielectric material. The dielectric material may, for example, be an oxide of e.g. Sc, Y, Ce, La, Ti, Zr, Hf, V, Nb, Ta, Zn, Al, Cr, In, Si, Ge, Sn, Sb or Te, a nitride of Ti, Zr, Hf, V, Nb Ta, Cr, Mo, W, Zn, B, Al, Ga, In, Si, Ge, Sn, Sb or Pb, a carbide of Ti, Zr, Hf, V, Nb, Ta, Cr, Mo, W, Zn, B, Al, Ga, In or Si, or a mixture thereof. Further, the dielectric material may, for example, be a sulfide, selenide or telluride of e.g. Zn, Y, Cd, Ga, In, Si, Ge, Sn, Pb, Sb or Bi, a fluoride of Mg or Ca, or a mixture thereof.

Further, specific examples of the dielectric material include, for example, $ZnS-SiO_2$, SiN, $SiO_2$, $TiO_2$, CrN, $TaS_2$ and $Y_2O_2S$. Among these materials, $ZnS-SiO_2$ is widely used from the viewpoint of the high film-forming rate, the small film stress, the small volume change due to the temperature change and the excellent weather resistance.

As the material for the first protective layer, various materials may be used as mentioned above, but it is preferred to employ the same material as the material for the protective layer containing sulfur, as mentioned in the above (3). If the same material is used, the production efficiency and the mass productivity will be improved.

The thickness of the first protective layer is usually at least 10 nm, preferably at least 20 nm, more preferably at least 40 nm, while it is usually at most 400 nm, preferably at most 300 nm, more preferably at most 150 nm. In the above range, the effect for suppressing a deformation of the substrate or the recording layer by heat will be sufficient, and the role of the protective layer will be sufficiently performed. Further, if it is too thick, cracking is likely to result due to the internal stress of the film itself, and the productivity will also be poor. However, in the above range, it will be possible to prevent cracking and to maintain the productivity to be satisfactory.

The recording layer is as described in the above (4).

Further, the thicknesses of the recording layer and the protective layer are selected taking into consideration not only the restriction from the viewpoint of the above mechanical strength and reliability but also the interference effect attributable to a multilayer structure so that the efficiency for absorbing a laser beam will be good, and the amplitude of the recording signals i.e. the contrast between the recorded state and the non-recorded state will be large.

The recording layer, the protective layer, the reflective layer and the interface layer will be formed by e.g. a sputtering method. It is preferred to carry out film formation in an in-line apparatus having the respective sputtering targets installed in the same vacuum chamber, whereby oxidation or contamination between the respective layers can be prevented. Further, such a method is excellent also from the viewpoint of the productivity.

The material for the second protective layer containing sulfur may be one as described in the above (3). The thickness of the second protective layer is usually at least 5 nm, preferably at least 10 nm, more preferably at least 15 nm. In this range, deformation of the recording layer can be effectively suppressed. On the other hand, the thickness of the second protective layer is usually at most 60 nm, preferably at most 30 nm. In this range, there will be no accumulation of microscopic plastic deformations in the interior of the protective layer in the repeated recording. Further, it will be possible to sufficiently secure the cooling rate of the recording layer.

The interface layer and the reflective layer are as described in the above (1) and (2).

On these layers, a protective coating layer made of e.g. an ultraviolet curable resin may be formed for protection. Such a protective coating layer is provided for the purpose of protecting the sputtered films on the substrate from water or dust, and in many cases, it is one having a photocurable resin cured. Especially, an ultraviolet cured resin of an acrylate type is excellent from the viewpoint of its stability, water resistance, curing property and low shrinkage during the curing. Further, its thickness is preferably within a range of from 2 μm to 15 μm so as to have a function to protect the sputtered film from moisture or dust and to suppress warpage of the medium after the curing. The protective coating layer is formed usually by a spin coating method, and prepared by dropping a non-cured photocurable resin, followed by spin coating and then by curing by irradiation with light.

Further, in the optical information recording medium of construction 1, in order to increase the recording capacity, two or more recording layers may be formed on the substrate, or after forming the above-mentioned respective layers on the substrate, they may be bonded with an adhesive. Further, a primer layer may be formed between the substrate and the protective layer.

(5-2) Optical Information Recording Medium of Construction 2

The optical information recording medium of construction 2 takes a construction wherein a reflective layer containing Ag as the main component, an interface layer, a first protective layer containing sulfur, a recording layer and a second protective layer are laminated on a substrate in this order. Here, the reflective layer containing Ag as the main component, the interface layer, the first protective layer containing sulfur, the recording layer and the second protective layer, may be the same as those described with respect to the optical information recording medium of construction 1 in the above (5-1). However, the first protective layer containing sulfur in construction 2 corresponds to "the second protective layer containing sulfur" in construction 1, and the second protective layer in construction 2 corresponds to "the first protective layer" in construction 1. Further, in construction 2, the substrate is not required to be transparent, and the freeness in the selection of the material which can be used for the substrate will be high.

On these layers, a light transmitting layer made of e.g. an ultraviolet curable resin, may be formed. For the light transmitting layer, the same material as for the protective coating layer in the optical information recording medium of construction 1, may be employed. The light transmitting layer is required to protect a sputtered film from moisture or dust in the same manner as the above-mentioned protective coating layer and at the same time is required to have a role as a thin incident substrate. Accordingly, the light transmitting layer is preferably transparent to a laser beam employed for recording and playback. At the same time, the thickness of the light transmitting layer is preferably from 50 μm to 150 μm, and it is preferred to realize a uniform thickness distribution within 5 μm in the optical information recording medium. The light transmitting layer is formed by coating an ultraviolet curable resin by a spin coating method, followed by curing, or by bonding transparent sheets.

Further, in the optical information recording medium of construction 2, a subbing layer may be formed between the substrate and the reflective layer. The subbing layer has an effect of suppressing peeling between the substrate and the reflective layer, and whereby it becomes possible to obtain an optical information recording medium excellent in weather resistance. The subbing layer is preferably one which has a good adhesion to the substrate and the reflective layer, will not corrode the reflective layer, or will not diffuse to the reflective layer and is excellent in flatness of the film surface. The material for the subbing layer may suitably be selected from simple substances or mixtures, such as metals, semiconductors, metal oxides, metal nitrides, metal carbides, semiconductor oxides, semiconductor nitrides, semiconductor carbides, fluorides or amorphous carbon, which satisfy the above conditions.

Now, the present invention will be described din further detail with reference to Examples. However, it should be understood that the present invention is by no means restricted to the following Examples.

EXAMPLE 1

Tests 1 to 3 and Reference Test 1

On a polycarbonate substrate having a track pitch of the substrate of 0.74 μm, a groove width of 0.32 μm, a groove depth of 32 nm, a thickness of 0.6 mm and a diameter of 12 cm, by a sputtering method employing Ar gas, 80 nm of a $(ZnS)_{80}(SiO_2)_{20}$ protective layer, 14 nm of an $In_3Ge_3Sb_{70}Te_{24}$ recording layer $(In_3Ge_3(Sb_{74.5}Te_{25.5})_{94})$, 22 nm of a $(ZnS)_{80}(SiO_2)_{20}$ protective layer, a Nb layer (interface layer) and 150 nm of a Ag reflective layer were formed in this order. Here, the thickness of the Nb layer was four types i.e. 2 nm (Test 1), 5 nm (Test 2), 8 nm (Test 3) and 20 nm (Reference Test 1).

Film formation of each layer was carried out after the ultimate vacuum of at most $4\times10^{-4}$ Pa was reached. The first protective layer was formed by RF sputtering of a film forming power of 2 kW at a film forming pressure of $2.6\times10^{-1}$ Pa while introducing Ar gas; the recording layer was formed by RF sputtering of a film forming power of 300 W under a film forming pressure of $2.1\times10^{-1}$ Pa; the second protective layer was formed by RF sputtering of a film forming power of 1.2 kW under a film forming pressure of $3.9\times10^{-1}$ Pa; the Nb layer was formed by DC sputtering of a film forming power of 500 W under a film forming pressure of $1.7\times10^{-1}$ Pa; and the reflective layer was formed by DC sputtering of a film forming power of 750 W under a film forming pressure of $6.4\times10^{-1}$ Pa.

A protective coating layer made of an ultraviolet curable resin was coated thereon, followed by bonding with a polycarbonate disk having a diameter of 12 cm and a thickness of 0.6 mm to obtain an optical information recording medium having a thickness of 1.2 mm.

Test 4

On a polycarbonate substrate having a track pitch of the substrate of 0.74 μm, a groove width of 0.32 μm, a groove depth of 32 nm, a thickness of 0.6 mm and a diameter of 12 cm, by a sputtering method employing Ar gas, 80 nm of a $(ZnS)_{80}(SiO_2)_{20}$ protective layer, 14 nm of an $In_3Ge_3Sb_{70}Te_{24}$ recording layer, 22 nm of a $(ZnS)_{80}(SiO_2)_{20}$ protective layer, 5 nm of a Mo layer (interface layer) and 150 nm of a Ag reflective layer were formed in this order under the film forming conditions as in Tests 1 to 3. A protective coating layer made of an ultraviolet curable resin was coated thereon, followed by bonding with a polycarbonate disk having a diameter of 12 cm and a thickness of 0.6 mm to obtain an optical information recording medium having a thickness of 1.2 mm.

Measurements

The initial crystallization of the optical information recording media obtained as described above, as carried out by means of a high power semiconductor laser at a linear velocity of 5 m/s. Here, the initialization laser power was set to be 1,400 W. For recording and evaluation of the characteristics of the recording signal, disk tester DDU1000, manufactured by Pulstec Industrial Co., Ltd with a wavelength of 650 nm and NA=0.65, was used. The standard linear velocity was set to be 3.5 m/s, and the standard clock frequency was set to be 26.2 MHz. The recording was carried out with a frequency of two times (52.4 MHz) of the standard clock frequency at a linear velocity of two times (7 m/s) the standard linear velocity. The optimum recording power is defined to be a power with which the asymmetry ($A_{sym}$) after overwriting ten times becomes substantially zero. Further, at the optimum recording power of this definition, also jitter became substantially minimum.

Here, the definition of asymmetry will be described with reference to the schematic view of the playback waveform of 8–16 modulation signal (I pattern) shown in FIG. 1. The I pattern in FIG. 1 contains substantially randomly playback waveforms of from 3T to 11T and 14T amorphous marks and crystalline state spaces. Here, nT mark is a mark having a time length being n times the standard clock period T. The playback waveform is the waveform as observed on an oscilloscope when the reflected light intensity was taken out as a voltage signal and observed on the oscilloscope. At that time, the playback signal contains a direct current component. $I_{14H}$ in FIG. 1 is the output voltage of an envelope curve of a 14T space playback waveform, $I_{14L}$ is the output voltage of an envelope curve of a 14T mark playback waveform, $I_{3H}$ is the output voltage level of an envelope curve of a 3T space playback waveform, and $I_{3L}$ is the output voltage level of an envelope curve of a 3T mark playback waveform. The asymmetry ($A_{sym}$) is a value defined by the following formula in FIG. 1:

$$A_{sym} = ((I_{14H}+I_{14L})/2 - (I_{3H}+I_{3L})/2)/(I_{14H}-I_{14L})$$

After overwriting ten times at the optimum recording power, the rotational speed of the disk was set to be the standard linear velocity of 3.5 m/s, whereby the jitter, the modulation (in FIG. 1, the modulation is defined by $(I_{14H}-I_{14L})/I_{14H}$) and the PI error as defined by the DVD standards were measured. Here, PI (Parity (of the) Inner (code)) error (number) is defined by DVD-ROM standards, e.g. in ECMA at page 268 19 and 25–27 and is an index for quality evaluation standards for DVD. The PI error is required to be at most 280 according to the DVD standards. Here, with respect to the PI error, after recording by tester DDU1000, manufactured by Pulstec Industrial Co., Ltd, the measurement was carried out by using playback tester LM220A manufactured by ShibaSoku Co., Ltd.

Further, in order to measure the transmittance, the Nb layer and the Mo layer were formed on slide glass substrates, by the film forming method under the conditions and in the film thicknesses as in the production of the optical information recording media in the above Tests 1 to 4, and the transmittance was measured at a wavelength of 650 nm by using a spectrophotometer (model name UV-3100S), manufactured by Shimadzu Corporation. The results of the foregoing tests are summarized in Table 1.

TABLE 1

| Sample identification | Thickness of interface layer (nm) | Transmittance of interface layer (%) | Recording power (mW) | After overwriting ten times | | |
|---|---|---|---|---|---|---|
| | | | | Jitter (%) | Modulation | PI error |
| Test 1 | 2 | 95 | 12.6 | 7.6 | 0.73 | 22 |
| Test 2 | 5 | 87 | 13.3 | 7.8 | 0.72 | 20 |
| Test 3 | 8 | 74 | 14.4 | 8.2 | 0.70 | 36 |
| Test 4 | 5 | 58 | 14.5 | 7.5 | 0.72 | 12 |
| Reference Test 1 | 20 | 28 | 17.8 | 8.1 | 0.66 | 45 |

Usually, when the jitter is not more than 9% and hen the modulation is at least 0.6%, the recording characteristics are considered to be good. Further, the upper limit of the recording power is usually permitted to be up to 15 mW (e.g. see DVD+RW standards (ECMA337)). It is evident that the recording characteristics and the recording sensitivity in Tests 1 to 4 satisfy these standards and are good. In Tests 1 to 3, it is evident that the optimum recording power increases as the thickness of the Nb layer increases. The power required for recording becoming high, means that the recording sensitivity decreases. The optimum recording power in Test 3 is 14.4 mW, which is higher by 1.8 mW as compared with Test 1. This decrease in the recording sensitivity is considered to be attributable to the facts that the thickness of the Nb layer became thick, whereby the transmittance to the wavelength to be used for recording decreased and the heat dissipation to the Ag reflective layer was hindered. In Reference Test 1 wherein the thickness of the Nb layer was 20 nm, the decrease of the recording sensitivity further advanced although the recording characteristics were relatively good, and the optimum recording power became 17.8 mW.

Further, the long term storage stability of the optical information recording media in Tests 1 to 4 was evaluated by exposing them in an environment of 80° C. under a relative humidity of 85% for 500 hours to see an increase of the PI error. The results are shown in Table 2.

TABLE 2

| Sample identification | PI error before accelerated test | PI error after 500 hours at 80° C. under relative humidity of 85% |
|---|---|---|
| Test 1 | 22 | 40 |
| Test 2 | 20 | 46 |
| Test 3 | 36 | 42 |
| Test 4 | 23 | 50 |

After 500 hours, the PI error increased, but it was still not higher than 50. Namely, the error is maintained to be sufficiently low even after the accelerated test for 500 hours, judging from the fact that according to the DVD standards, the PI error is permitted to be up to 280. Thus, the high level of storage stability of the optical information recording media in Tests 1 to 4 was confirmed.

INDUSTRIAL APPLICABILITY

According to the present invention, corrosion of Ag by a reaction of a reflective layer with a protective layer, which is problematic when a protective layer containing sulfur and a reflective layer containing Ag as the main component and having high heat dissipation property are used, can effectively be suppressed by providing an interface layer containing Nb and/or Mo as the main component, between the reflective layer and the protective layer. As a result, it is possible to obtain a very high performance optical information recording medium excellent in the recording characteristics and durability.

The present invention has been described in detail with reference to specific embodiments, but it is apparent to those skilled in the art that various changes and modifications are possible without departing from the concept and scope of the present invention. The present application is based on a Japanese Patent Application (JP2002-260730) filed on Sep. 6, 2002, and the entire disclosure thereof is hereby included by reference.

What is claimed is:

1. An optical information recording medium comprising a substrate, a recording layer, a sulfur-containing protective layer, an interface layer in contact with the protective layer and a reflective layer in contact with the interface layer and containing Ag as the main component, wherein the interface layer contains Nb and/or Mo as the main component.

2. The optical information recording medium according to claim 1, wherein the interface layer has a light transmittance of at least 50% at the center wavelength of light to be used for recording on the optical information recording medium.

3. The optical information recording medium according to claim 1, wherein the interface layer has a thickness of from 1 nm to 10 nm.

4. The optical information recording medium according to claim 1, wherein the reflective layer contains at least 80 atomic % of Ag.

5. The optical information recording medium according to claim 4, wherein the reflective layer contains, as an element other than Ag, at least one selected from the group consisting of Ti, V, Ta, Co, Cr, Si, Ge, Sn, Sc, Hf, Pd, Rh, Au, Pt, Mg, Zr, Cu, Mo and Mn.

6. The optical information recording medium according to claim 1, wherein the sulfur in the protective layer is present in the form of a sulfide or an oxysulfide of any element selected from a rare earth element, Zn and Ta, in the protective layer.

7. The optical information recording medium according to claim 1, wherein the recording layer has a composition containing Sb as the main component.

8. The optical information recording medium according to claim 7, wherein the recording layer further contains Ge and/or Te, and the content of each of Ge and Te in the recording layer is from 1 atomic % to 30 atomic %.

9. The optical information recording medium according to claim 7, wherein the recording layer further contains at least one of In, Ga and Sn, and the content of each of In, Ga and Sn in the recording layer is from 1 atomic % to 30 atomic %.

* * * * *